United States Patent
Thio

(10) Patent No.: US 7,006,448 B1
(45) Date of Patent: Feb. 28, 2006

(54) SYSTEM AND METHOD FOR MEASURING NETWORK ROUND TRIP TIME BY MONITORING FAST-RESPONSE OPERATIONS

(75) Inventor: Ling Thio, Sunnyvale, CA (US)

(73) Assignee: Lucent Technologies Inc., Murray Hill, NJ (US)

(*) Notice: Subject to any disclaimer, the term of this patent is extended or adjusted under 35 U.S.C. 154(b) by 873 days.

(21) Appl. No.: 09/675,310

(22) Filed: Sep. 29, 2000

Related U.S. Application Data

(60) Provisional application No. 60/156,981, filed on Oct. 1, 1999.

(51) Int. Cl.
*G01R 31/08* (2006.01)

(52) U.S. Cl. ............... 370/252; 370/389; 709/202; 709/224

(58) Field of Classification Search ......... 370/252, 370/230, 466, 352, 231, 235, 253, 238, 350, 370/314, 321, 389–394; 465/389–395, 412, 465/334–345, 477, 257; 709/223–228, 235–238, 709/217–222, 230–234, 202; 375/145–150, 375/240, 280, 225; 707/104.1, 10; 345/340
See application file for complete search history.

(56) References Cited

U.S. PATENT DOCUMENTS

| | | | |
|---|---|---|---|
| 5,802,106 A * | 9/1998 | Packer | 375/225 |
| 6,061,722 A * | 5/2000 | Lipa et al. | 709/224 |
| 6,078,919 A * | 6/2000 | Ginzburg et al. | 707/10 |
| 6,097,699 A * | 8/2000 | Chen et al. | 370/231 |
| 6,205,120 B1 * | 3/2001 | Packer et al. | 370/235 |
| 6,212,171 B1 * | 4/2001 | LaFollette et al. | 370/257 |
| 6,370,572 B1 * | 4/2002 | Lindskog et al. | 709/223 |
| 6,442,603 B1 * | 8/2002 | Borella | 709/218 |
| 6,473,407 B1 * | 10/2002 | Ditmer et al. | 370/252 |
| 6,601,098 B1 * | 7/2003 | Case et al. | 709/224 |
| 6,633,582 B1 * | 10/2003 | Panburana et al. | 370/465 |
| 6,665,271 B1 * | 12/2003 | Thomas et al. | 370/252 |
| 6,681,230 B1 * | 1/2004 | Blott et al. | 707/104.1 |
| 6,731,625 B1 * | 5/2004 | Eastep et al. | 370/352 |

* cited by examiner

*Primary Examiner*—Chi Pham
*Assistant Examiner*—Prenell Jones

(57) ABSTRACT

A system and method is provided for measuring network round trip time by monitoring fast-response operations at one network endpoint, typically a client computer. A client computer of the system includes a network monitoring and analysis engine which monitors a sent packet for a fast-response operation. If a fast-response operation is detected, then the client computer assumes a server computer processed the packet substantially instantaneously. Thus, the processing time at the server computer is neglected as zero. The round trip time can then be approximated as the difference in time between when the client computer sent the packet and when the client computer received the response packet.

12 Claims, 6 Drawing Sheets

SYSTEM AND METHOD FOR MEASURING NETWORK ROUND TRIP TIME BY MONITORING FAST-RESPONSE OPERATIONS

CROSS-REFERENCE TO RELATED APPLICATION

This application is related to, and claims the benefit of, U.S. Provisional Application No. 60/156,981, entitled "Method for Measuring Network Round Trip Time by Monitoring Fast-Response Operations," filed Oct. 1, 1999, which is hereby incorporated by reference.

BACKGROUND

1. Field of the Invention

The present invention relates generally to computer networks, and more particularly to a system and method for measuring network round trip time.

2. Description of the Prior Art

Recent growth in and an increasing reliance on networked computer applications have generated a need for network performance monitoring tools. Measuring the performance of networked systems is a significant consideration of users, designers, and manufacturers of these systems. Such monitoring tools allow system administrators and others to observe network responses to varying loads and conditions, to identify and diagnose problems in the communications paths, and to optimize network architectures to avoid bottlenecks and other congestion-causing conditions. There is a specific need for tools which measure delays associated with application execution and determine which portion of the delay is attributable to the network, which portion is attributable to the server, and so on.

Network performance monitoring tools are generally configured to measure and display various parameters characterizing communications between or among a plurality of network endpoints. In TCP/IP-based networks, one such parameter is the network Round Trip Time (RTT).

FIG. 1 depicts an exchange of packets between a client computer 100 and a server computer 110 over a network 120. At time $t_{C1}$, client computer 100 sends a packet 130. By way of example, packet 130 may represent a database search query. Packet 130 travels on network 120 and arrives at server computer 120 at time $t_{S1}$. During a Server Delay (SD) time, packet 130 is delivered to a database engine residing on server computer 110, which processes the search query and responsively generates a search result. At time $t_{S2}$, the server computer 110 sends a response packet 140 containing search results. Packet 140 travels over network 120 and arrives at client computer 100 at time $t_{C2}$.

The total transaction time of the foregoing transaction is given by the equation:

$$TT = SD + RTT$$

where TT is the transaction time. In accordance with the example depicted in FIG. 1:

$$RTT = (t_{S1} - t_{C1}) + (t_{C2} - t_{S2}).$$

This example and many prior art packages require that both network endpoints (i.e., both the client computer 100 and the server computer 110) be instrumented in order to monitor the various times. However, a problem exists where network performance is to be monitored at only one of two network endpoints. For example, it may be desirable to locate the network performance-monitoring tool at client computer 100. To accurately calculate the RTT, however, it is necessary to have knowledge of the server computer 110 packet receive and send times, $t_{S1}$ and $t_{S2}$, which will not be available to client computer 100. Therefore, there is a need for a system and method for measuring network round trip time at a single network endpoint.

SUMMARY

The present invention provides a system and method for measuring network round trip time by monitoring fast-response operations at one network-endpoint. The system of the invention includes a network monitoring and analysis engine on the network endpoint which monitors a sent packet for a fast-response operation. If a fast-response operation is detected, then the network endpoint, typically a client computer, will assume a server computer processed the packet substantially instantaneously. Thus, the processing time at the server computer is estimated to be zero. The round trip time can then be approximated as the difference between when the packet was sent and when a response packet was received by the client computer.

The invention therefore provides a method for measuring network round trip time at one endpoint which is computationally efficient, easily implemented, and may be utilized with any networked application.

DETAILED DESCRIPTION OF A PREFERRED EMBODIMENT

Figure 1:
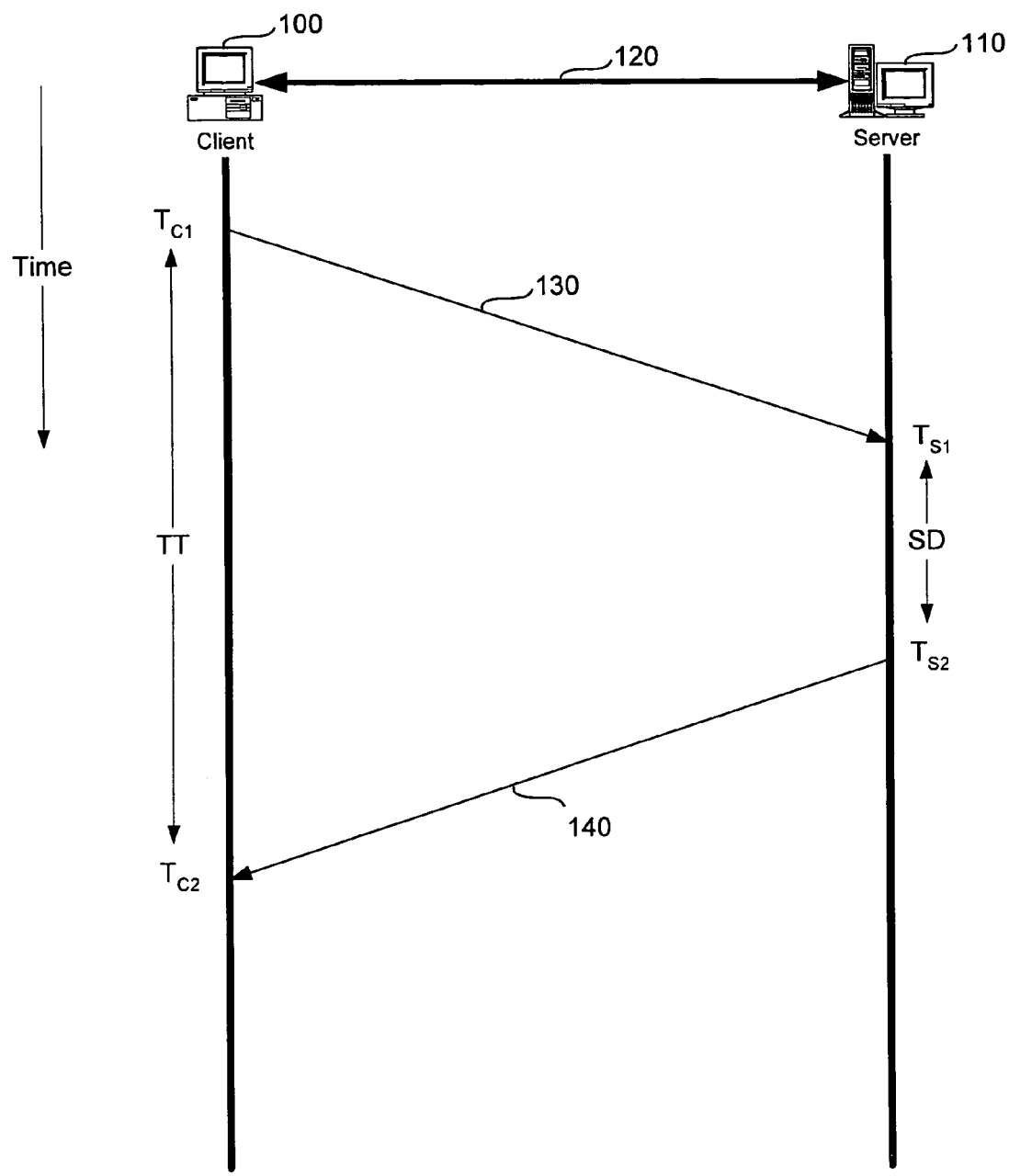
FIG. 1 is a diagram showing a conventional exchange of packets during a transaction between a client and a server.
Figure 2:
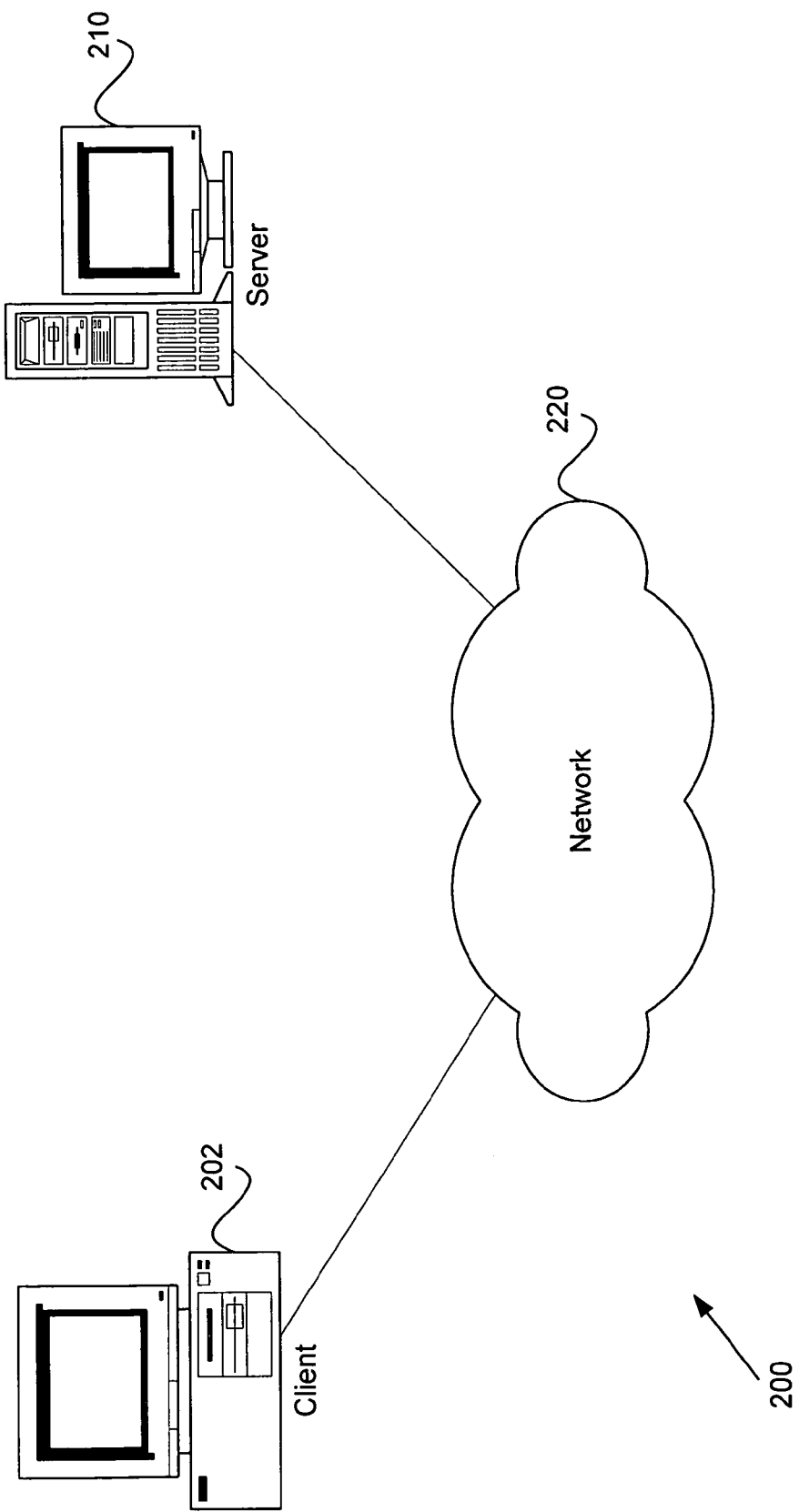
FIG. 2 is a diagram of an exemplary network system for implementing the invention.

FIG. 2 depicts an exemplary network system 200 for implementation of the present invention. A plurality of computers, including, for example, a client computer 202 and a server computer 210, are coupled for intercommunication by a network 220 implementing the TCP/IP protocol. Network 220 is of arbitrary topology and complexity, and client and server computers 202 and 210 may be connected by a variety of network interfaces to network 220. Network 220 may comprise a public packet-switched network, such as the Internet, or alternatively may comprise a private TCP/IP based network, known colloquially as an intranet.

In networked applications, data processing functions are distributed between the client computer 202 and server computer 210. For example, a networked database application locates software for front-end functions, such as a user interface, at client computer 202, while software for back-end functions, such as processing SQL statements, is located at server computer 210. Requests and data generated by the front and back ends are periodically communicated between client computer 202 and server computer 210 over network 220.

In a typical network transaction, client computer 202 requests specific data from server computer 210 via a data exchange through network 220. Server computer 210 then processes the request and delivers data to client computer 202. The initial request from client computer 202 and the data from server computer 210 pass through various routers and transmission links in network 220. The exact path of the transmissions through network 220 is typically unknown, and may be different for each connection between client and server computers 202 and 210, respectively.

Figure 3:
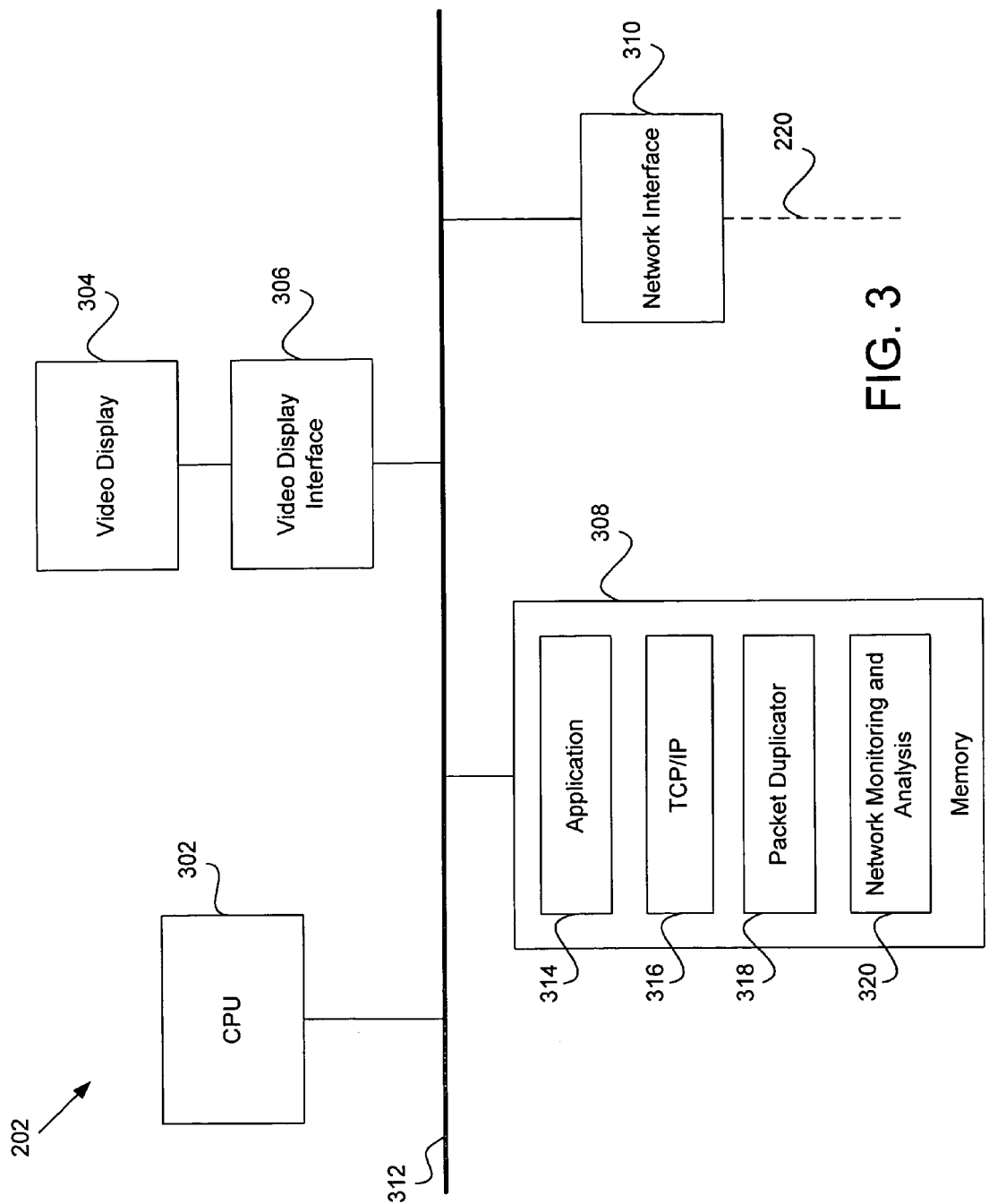
FIG. 3 is a block diagram of a client computer for implementing the invention.

FIG. 3 is a block diagram showing exemplary components of client computer 202. The client computer 202 includes a central processing unit (CPU) 302, video display 304, video display interface 306, memory 308 and network interface 310 all coupled either directly or indirectly to system bus 312. CPU 302 executes program instruction and manages communication between the various components of client computer 202.

Video display 304, coupled to video display interface 306, presents text, graphics and other visual information to a user. This information may also include results of the network round trip time analysis.

Memory 308 may comprise any one or a combination of volatile memory such as RAM, non-volatile memory such as ROM, or storage devices such as a magnetic hard drive. Memory 308 stores program instructions and data for processing by CPU 302. Such instructions and data may include, but are not limited to, application 314, TCP/IP stack 316, packet duplicator engine 318, and monitoring and analysis engine 320. Application 314 may include, without limitation, a database front-end, a browser or e-mail client, or a transaction processing application which transmits and/or receives data or requests over network 220.

TCP/IP stack 316 implements various functions of the TCP/IP protocol suite. The operation of TCP/IP stack 316, which may be incorporated into the client computer 202 operating system, is well known in the art and thus will not be described in detail herein.

Packet duplicator engine 318 utilizes well-known techniques to intercept and duplicate sent and received packets processed by TCP/IP stack 316. The duplicated packets are then delivered to the monitoring and analysis engine 320, which will be discussed in more detail in connection with FIG. 5.

Network interface 310 enables connection of client computer 202 to network 220. Network interface 310, conventionally, may comprise a modem, Ethernet card, or a digital subscriber line (DSL).

Figure 4:
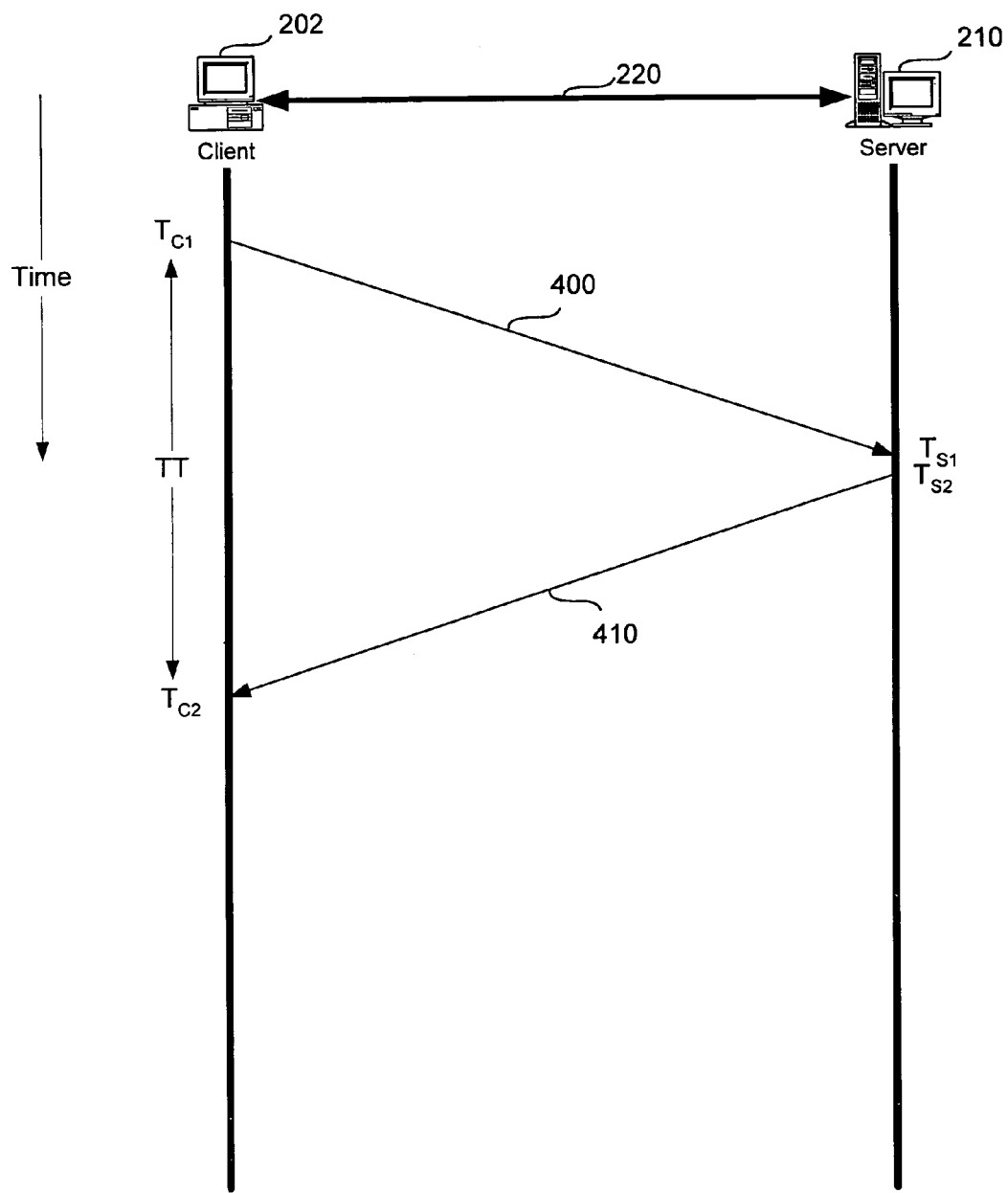
FIG. 4 is a diagram of an exchange of packets during a transaction between a client and a server with a fast-response operation.

FIG. 4 depicts an exchange of packets representative of a fast-response operation. At time $t_{C1}$, client computer 202 sends a request packet 400 over network 220. Packet 400 is received at server computer 210 at time $t_{S1}$. Server computer 210 then, substantially instantaneously, processes the information contained in packet 400. Subsequently, at time $t_{S2}$, server computer 210 sends a response packet 410 containing a response to client computer 202. Client computer 202 at time $t_{C2}$ receives packet 410.

The present invention measures network round trip time by monitoring for fast-response operations, which are operations involving client requests which may be processed relatively quickly by server computer 210. If the client request involves a fast response operation, server computer 210 processes the information contained in packet 400 substantially instantaneously. Consequently, the server delay is substantially less than the round trip time (SD<<RTT), and so the RTT can be closely approximated by calculating the difference between the time $t_{C1}$ the request is sent by client computer 202 and the time $t_{C2}$ the response from server computer 210 is received by client computer 202. As used herein a "fast response operation" refers to an operation completed by a processor substantially instantaneously, i.e. the processor delay time for processing a packet being substantially less than the round-trip time for the packet between two nodes in the network. Thus, the round trip time with a fast response operation is approximated by the equation:

$$RTT \sim t_{C2} - t_{C1}.$$

Subsequently, the total transaction time is calculated by the equation:

$$TT = SD + RTT$$

where SD is assumed to be negligible, resulting in:

$$TT \sim RTT \text{ or } TT \sim t_{C2} - t_{C1}.$$

Each application will have a characteristic set of fast-response operations associated therewith. For SQL database applications, exemplary fast-response operations include OPEN_CURSOR and CLOSE_CURSOR operations. Other fast-response operations are known to those having ordinary skill in the art.

Figure 5:
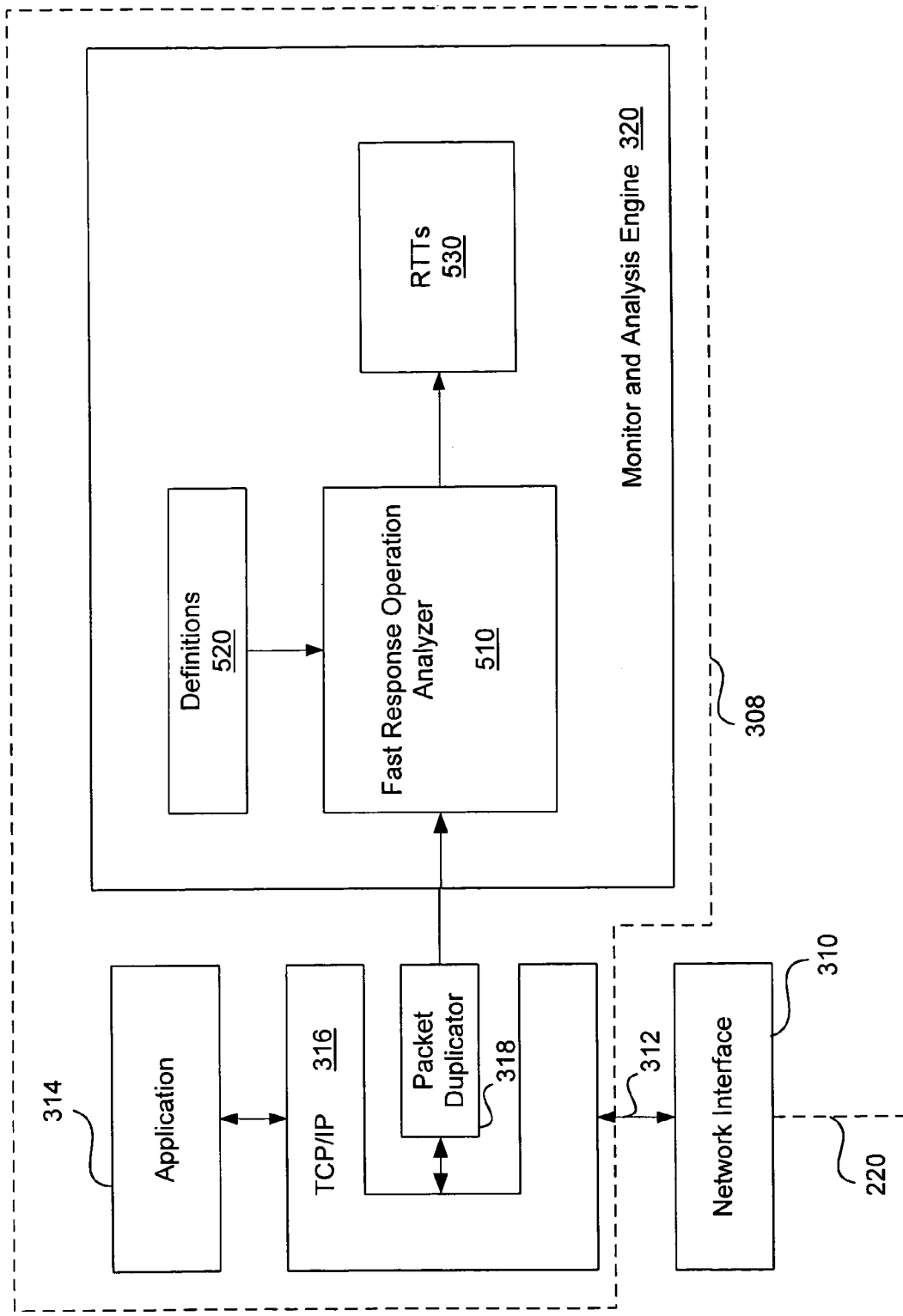
FIG. 5 is a block diagram of one embodiment of the monitoring and analysis engine of FIG. 3, according to the invention.

FIG. 5 depicts in block form one embodiment of the monitoring and analysis engine 320 according to the invention. Preferably, network interface 310 sends and receives packets over the network 220 (FIG. 2), and packet duplicator 318 is configured to intercept and duplicate these sent and received packets. Duplicated packets are then delivered to a fast-response operation analyzer 510 in the monitoring and analysis engine 320. Fast-response operation analyzer 510 is advantageously operative to examine each duplicated packet to determine if the packet contains information representative of a fast-response operation. Fast-response operation analyzer 510 may conventionally attempt to match information contained in the examined packet to user-supplied or automatically generated fast-response time operation definitions 520. The definitions 520 may list characteristic information associated with fast-response operations of the monitored application(s).

Upon detection of a fast-response operation, monitoring and analysis engine 320 is operative to calculate an RTT 530 corresponding to the detected fast-response operation by determining the difference between $t_{C2}$ and $t_{C1}$ (i.e., subtracting the time at which packet 400 (FIG. 4) is sent from the time at which packet 410 (FIG. 4) is received at client computer 202).

Figure 6:
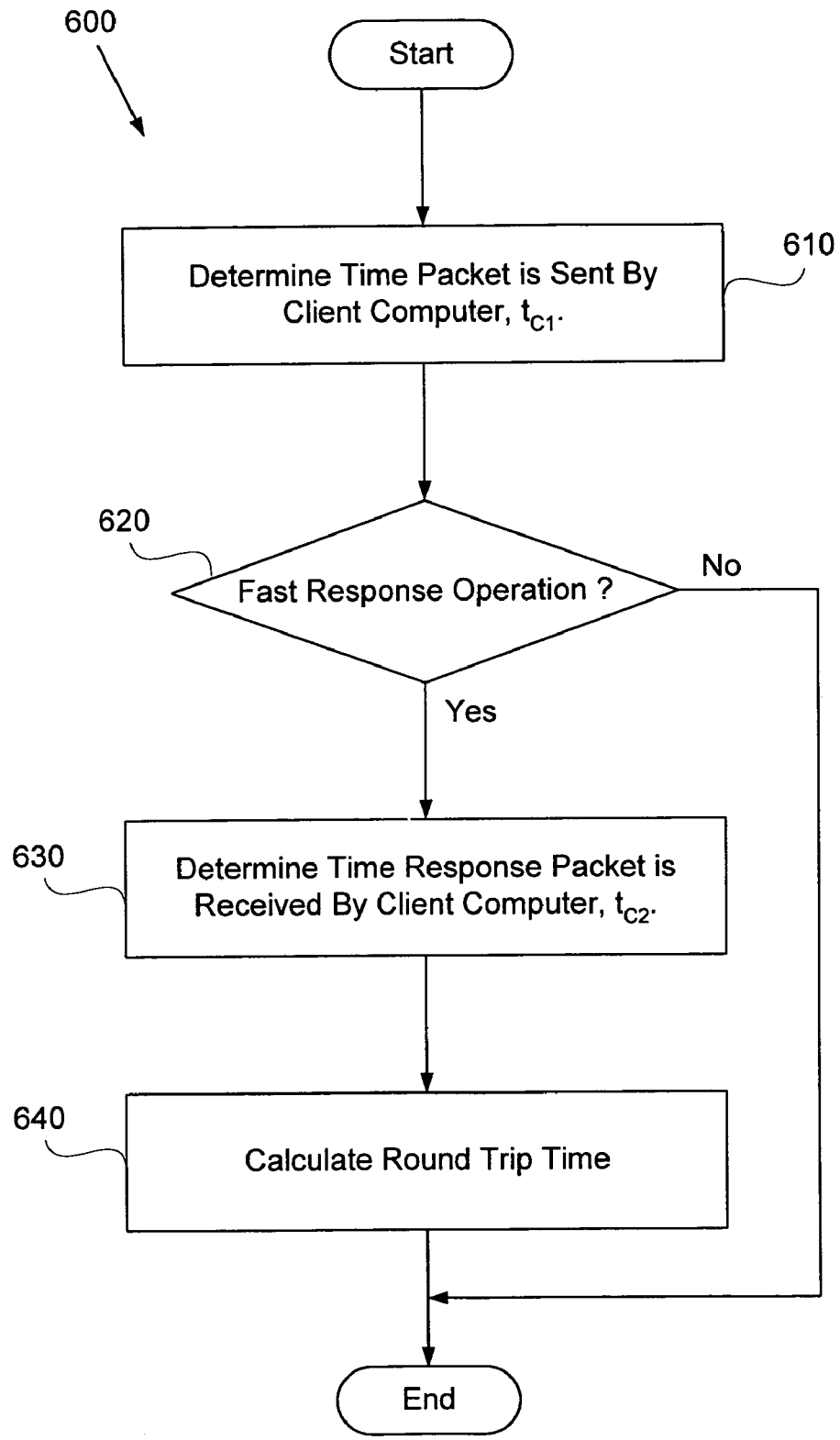
FIG. 6 is a flowchart of method steps for measuring round trip time, according to one embodiment of the invention.

FIG. 6 is a flowchart 600 depicting a preferred method for calculating round trip times, according to the invention. In block 610, a client computer 202 (FIG. 2) determines the time $t_{C1}$ a request packet 400 (FIG. 4) is sent to a server computer 210 (FIG. 2).

Next, the client computer 202 determines if a fast response operation is contained in the packet 400 in block 620. Fast-response operation analyzer 510 (FIG. 5) examines a duplicate copy of the sent packet 400 for information representative of a fast-response operation. If no fast-response operation is detected, then the method is not applicable for measuring network round trip time. However, if a fast-response operation is detected, then in block 630 the client computer 202 determines the time $t_{C2}$ a response packet 410 (FIG. 4) is received by the client computer 202.

Finally, in block 640, the client computer 202 calculates the round trip time, RTT. Because the server computer 210 substantially instantaneously processes the packet 400 with a fast-response operation, the time between $t_{S1}$ when the server computer 210 receives the packet and the time $t_{S2}$ the server computer 210 sends the response packet is deemed negligible. Thus, the round trip time, and subsequently the transaction time, is estimated to be the difference in time between when the client computer 202 sends the request packet 400 and when the client computer 202 receives the response packet 410.

The invention has been explained above with reference to a preferred embodiment. Various features and aspects of the above-described embodiment may be used individually or jointly. Further, although the invention has been described in the context of its implementation in a particular environment and for particular applications, those skilled in the art will recognize that its usefulness is not limited thereto and that the invention can be beneficially utilized in any number of environments and implementations. Therefore, these and other variations upon the preferred embodiments are intended to be covered by the invention, which is limited only by the appended claims.

What is claimed is:

1. A system for measuring network round trip time, comprising:
    a client computer adapted for communications with a server computer, the client computer including:
        a processor;
        memory coupled to the processor containing definitions identifying fast-response operations initiated by an application program running on the processor;
        a monitor and analysis engine, coupled to the processor, includes an analyzer for detecting the presence of at least one of the fast-response operations where fast-response operations are certain operations associated with normal running of the application program where the application program itself is not programmed to participate in determining the round trip time, the application program requiring the transmission of a first packet to the server computer and the receipt of a second packet from the server computer in response to the first packet, and;
        the monitor and analysis engine calculating the round trip time when a fast-response operation is detected based on the time interval beginning with the transmission of the first packet and ending with the receipt of the second packet.

2. The system of claim 1 wherein the memory includes fast-response time operation definitions which list characteristic information associated with fast-response operations.

3. The system of claim 2 wherein the definitions are user-supplied.

4. The system of claim 2 wherein the definitions are automatically generated.

5. The system of claim 1 wherein the client computer further comprises:
    a packet duplicator for intercepting and duplicating the first and second packets, and forwarding the duplicated packets to the monitoring and analysis engine for analysis.

6. The system of claim 1 further comprising a display device for displaying graphical representations of the round trip time.

7. The system of claim 1 where fast-response operations are further defined by delay associated with the generation of the second packet upon receipt of the first packet being substantially less than delay associated with round trip times of the first and second packets.

8. A method for measuring network round trip time, comprising the steps of:
    determining if a sent packet by a client computer to a server computer indicates a fast response operation where fast-response operations are certain operations associated with normal running of an application program on the client computer where the application program itself is not programmed to participate in determining the round trip time, the fast response operation including the transmission of a first packet to the server computer and the receipt of a second packet from the server computer responding to the first packet in response to the first packet occur; and
    if the first packet does indicate a fast response operation, determining the receipt of the corresponding second packet and calculating a round trip time based on a time interval beginning with the transmission of the first packet and ending with the receipt of the second packet.

9. The method of claim 8 further comprising duplicating the first and second packets by the client computer wherein the duplicated packets are forwarded to a monitoring and analysis engine.

10. The method of claim 8 further comprising the step of assuming that a packet indicating a fast-response operation was substantially instantaneously processed at the server computer.

11. The method of claim 8 further comprising the step of providing a representation of the round trip time via a display device of the client computer to a user.

12. A computer-readable medium storing program instructions for causing a computer to measure network round trip time, by performing the steps of:
    determining if a sent packet by a client computer to a server computer indicates a fast response operation where fast-response operations are certain operations associated with normal running of an application program on the client computer where the application program itself is not programmed to participate in determining the round trip time, the fast response operation including the transmission of a first packet to the server computer and the receipt of a second packet from the server computer responding to the first packet in response to the first packet occur; and
    if the first packet does indicate a fast response operation, determining the receipt of the corresponding second packet and calculating a round trip time based on a time interval beginning with the transmission of the first packet and ending with the receipt of the second packet.

* * * * *